United States Patent
West

[19]

[11] Patent Number: 5,967,657
[45] Date of Patent: Oct. 19, 1999

[54] MIXER VEHICLE WITH HELICAL SWEEP BARS AND A RETURN AUGER

[75] Inventor: Harry West, Prees, United Kingdom

[73] Assignee: Harry West (Prees) Ltd., Prees, United Kingdom

[21] Appl. No.: 09/209,520

[22] Filed: Dec. 10, 1998

Related U.S. Application Data

[63] Continuation of application No. PCT/GB97/01511, Jun. 4, 1997, abandoned.

[30] Foreign Application Priority Data

Jun. 15, 1996 [GB] United Kingdom .................. 9612566

[51] Int. Cl.$^6$ ..................................................... B01F 7/08
[52] U.S. Cl. ......................... 366/193; 366/195; 366/312; 366/320; 366/321; 366/603
[58] Field of Search .................................. 366/64–66, 67, 366/96–99, 102–104, 192–196, 292–295, 309, 312, 313, 318–321, 603

[56] References Cited

U.S. PATENT DOCUMENTS

| | | | |
|---|---|---|---|
| 3,482,821 | 12/1969 | Blackwood | 366/320 |
| 3,672,640 | 6/1972 | Crose . | |
| 3,797,807 | 3/1974 | Behrens | 366/321 |
| 3,995,836 | 12/1976 | Carter et al. | 366/603 |
| 4,298,289 | 11/1981 | Walley | 366/603 |
| 4,712,922 | 12/1987 | Feterl | 366/603 |
| 4,756,626 | 7/1988 | Neier | 366/603 |
| 5,275,335 | 1/1994 | Knight et al. | 366/603 |
| 5,395,286 | 3/1995 | Sgariboldi . | |
| 5,645,345 | 7/1997 | O'Neill et al. | 366/603 |

FOREIGN PATENT DOCUMENTS

| | | |
|---|---|---|
| 1052205 | 12/1966 | United Kingdom . |
| 2049455 | 12/1980 | United Kingdom .................. 366/603 |
| 2080662 | 2/1982 | United Kingdom . |
| 2232363 | 12/1990 | United Kingdom . |

*Primary Examiner*—Charles E. Cooley
*Attorney, Agent, or Firm*—Akin, Gump, Strauss, Hauer & Feld, L.L.P.

[57] ABSTRACT

Mixer vehicle is typically a tractor drawn and powered trailer for mixing and distribution of bulk materials such as farm animals feedstuffs. It includes a semi-cylindrical body (10) having a side discharge opening (22) with a single logitudinal agitation rotor (36) centered therein, the rotor having helical sweep bars (40) rotating close to the body wall in at least the body part not occupied by the opening acting as a skeleton auger driving material along the body into its discharge zone, and a lesser diameter return auger (50) in the latter zone acting to return material from that zone so that the material is circulated for mixing. When a door (28) is opened the action of the rotor discharges the material through the opening where it may be further acted on by a faster feed-out rotor (34).

11 Claims, 2 Drawing Sheets

MIXER VEHICLE WITH HELICAL SWEEP BARS AND A RETURN AUGER

CROSS REFERENCE TO RELATED APPLICATION

This is a continuation of International Application PCT/GB/01511, with an international filing date of Jun. 4, 1997, now abandoned.

BACKGROUND OF THE INVENTION

This invention relates to mixer vehicles for the mixing, transport and distribution of bulk animal feedstuffs, for example silage, meal concentrates, and/or feed supplements for farm livestock; or similar materials.

Typically the vehicle will be a trailer drawn by and have mixing mechanism powered from a tractor.

SUMMARY OF THE INVENTION

The object of the invention is to provide a mixer vehicle which is of simple construction and efficient and reliable in operation.

It is known from GB-A-2080662 to provide a bulk material distribution vehicle having a feed rotor in the form of a large diameter skeleton auger within its body rotating in close proximity to the lower walls and floor for urging material along the body to a discharge opening. Said auger may include opposite handed bars for urging material back from an end wall towards the opening.

GB-A-2232363 describes a similar vehicle with an auger-type large diameter main feed rotor, and also provided with a counterflow formation on the main rotor shaft at one end of the body much smaller in diameter than the main rotor and having planar blades short in axial extent and angled at a pitch angle to urge material away from the adjacent end wall.

According to the invention there is provided a mixer vehicle having a body for containing a bulk of material or materials and having a generally semi-cylindrical base portion centered on a longitudinal axis within the body; a side discharge opening in a discharge zone of the body and controlled by selectively operable closure means; and a mixing mechanism comprising a single agitation rotor within the body operatively power driven for rotation about the axis. The agitation rotor has one or more sweep bars extending substantially the full length of the body or at least the length of a non-discharge zone or zones of the body and lying at the periphery of a cylindrical envelope of revolution bounded by or in close proximity to the base portion semi-cylindrical wall surface or surfaces of at least the non-discharge zone or zones. The bar or bars each have a helical conformation of coarse pitch so as to act as a skeleton auger sweeping material around the latter wall surface or surfaces with a component of movement along the respective zone or zones toward the discharge zone in use. The mixing mechanism further includes a return auger formation co-extensive with the discharge zone of the body and having a helical flight or flights and an envelope of revolution of substantially less maximum radius than that of the sweep bar or bars, the flight or flights being so handed as to urge material longitudinally from the discharge zone into the non-discharge zone or zones in use.

The discharge zone may be an end zone of the body, conveniently defined in part by a front end wall of the body, and it may occupy approximately one third of the total body length corresponding to the maximum effective width of the opening.

For some applications the discharge zone may be spaced from the ends of the body by front and rear non-discharge zones and having respectively handed helically conformed sweep bars acting to urge material from front and rear to the discharge zone, and with the return auger formation having oppositely handed flight sections so as to return material from the discharge zone in contraflow to the sweep bar inputs to said zone.

Preferably there are three or four sweep bars spaced equi-angularly about said axis.

Said bar or bars will conveniently extend the full length of the body and have non-helical portions co-extensive with the discharge zone and radially spaced from the return auger formation to sweep material up to the opening so that it is discharged therefrom when fully or partly opened.

Preferably the vehicle further includes a feed out rotor in an enclosure immediately beyond the opening acting on material passing therethrough in use to project it clear of the body.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

DETAILED DESCRIPTION OF THE INVENTION

Figure 1:
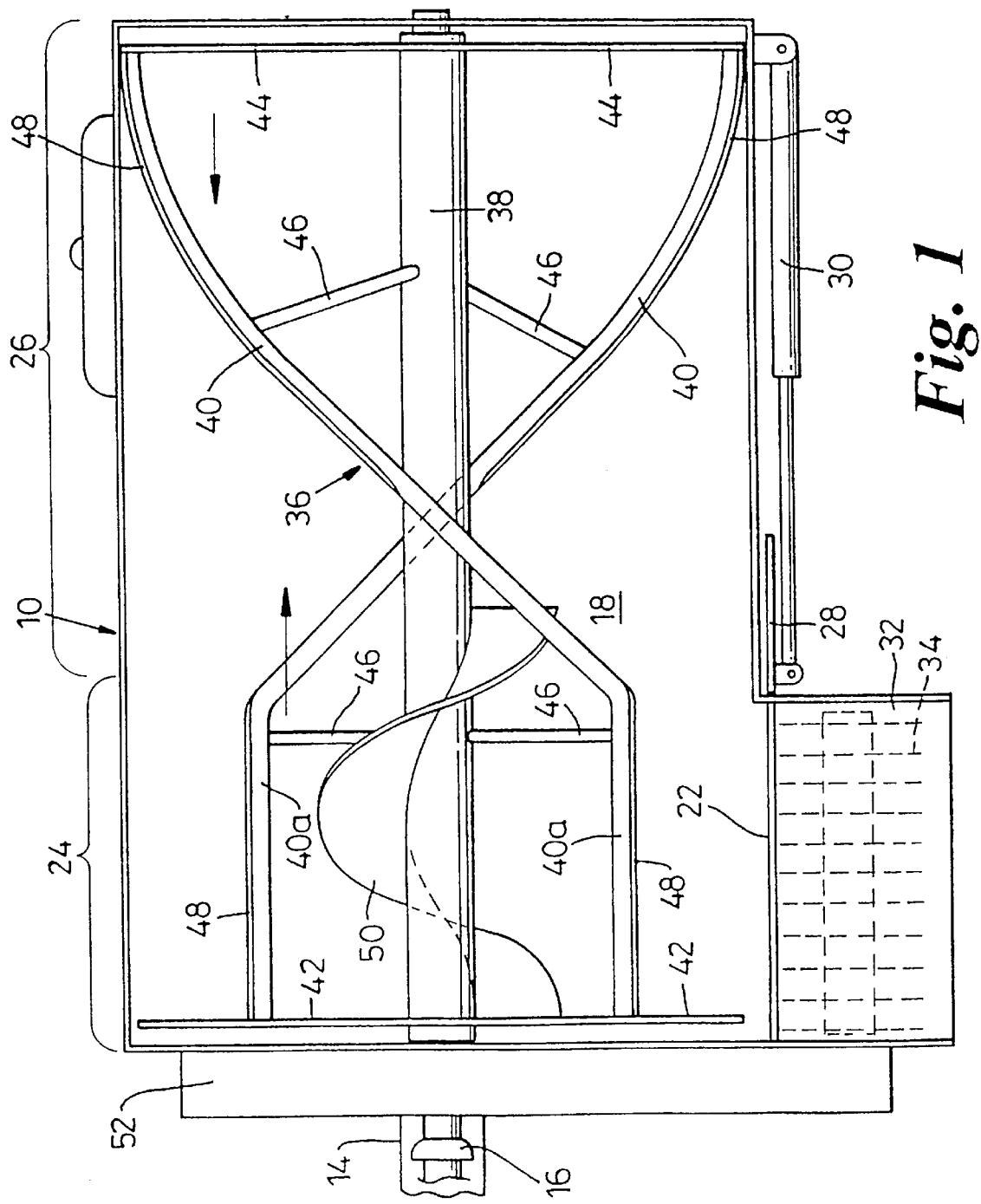
FIG. 1 is an overhead plan view of a mixer vehicle.

The mixer vehicle is a tractor drawn trailer having a body 10 mounted on a two-wheeled chassis 12 with a drawbar 14 at the front end which is also provided with a standard P.T.O. connection 16 for power input from the tractor in use.

Body 10 has a semi-cylindrical base portion 18 centered on a longitudinal axis 20 and occupying approximately half its height, the upper part being straight-sided and open-topped. The radius of portion 18 in this example is about 1 meter so that the body width is about 2 meters and it is substantially equivalent in height.

Figure 2:
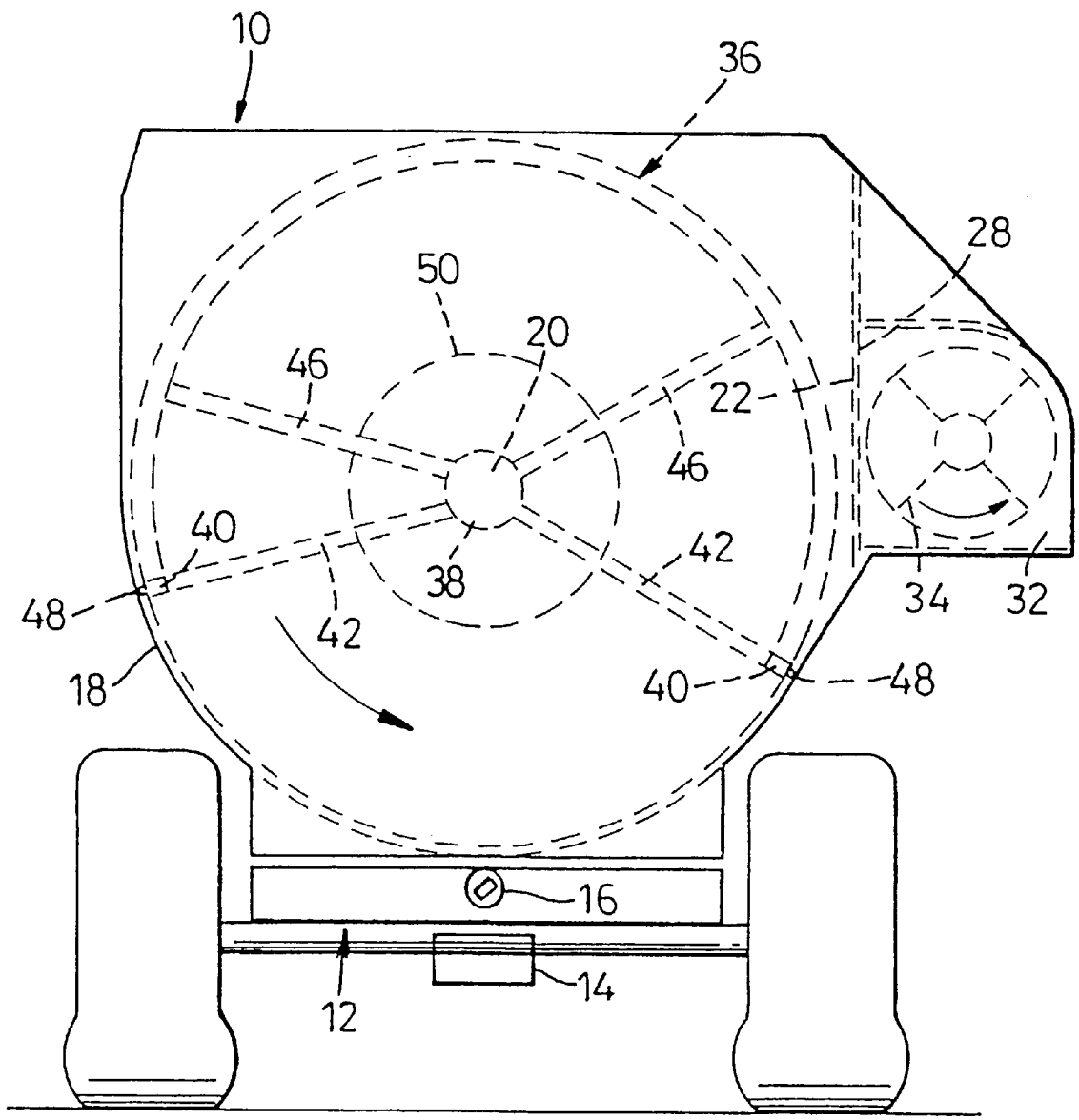
FIG. 2 is a schematic front end elevation thereof.

Body 10 is about 3 meters long and has a side discharge opening 22 in its right hand side wall as viewed in FIG. 2 (i.e. to the left of forward travel of the vehicle) in a vertical plane extending a short distance below the level of axis 20. Opening 22 has a height of approximately 65 cm and a width of approximately 1 meter, i.e., it occupies a discharge zone, in this example a front end zone 24, of about one third of the total body length leaving a remaining non-discharge zone 26 extending rearwardly thereof.

Opening 22 is provided with a horizontally sliding closure door 28 operated by a hydraulic ram 30 enabling it to be fully closed or enabling its effective opening to be regulated. For some applications a vertically sliding door might be used.

An outrigger housing 32 projects beyond opening 22 and contains a power driven feed-out rotor 34 on a horizontal axis and having vanes or beaters for propelling material passing from the body through opening 22 in an undershot fashion clear of the body.

Within body 10 is an agitation rotor 36 comprising a tubular shaft 38 centered on axis 20 and extending the full length of body 10 journalled in its vertical end walls.

Rotor 36 further comprises sweep bars 40, three or four in number (two only shown in FIG. 1) spaced equi-angularly about shaft 38 and spaced radially therefrom.

The extremities of bars 40 are carried on front and rear arms 42, 44 attached to the ends of shaft 38 in close overlying relationship to the inner faces of the two end walls, the radius of the arms being just less than that of body part 18. Intermediate parts of bars 40 are supported by arms or spokes 46 projecting from shaft 38.

Bars 40 lie in a cylinder of revolution in close proximity to the semi-cylindrical wall surface in body part 18 and are provided with flexible rubber or other scraper strips 48 which press against said surface to sweep material over it.

The parts of bars 40 extending longitudinally of non-discharge zone 26 are of coarse-pitched helical form so that they constitute a skeleton auger fitting within body part 18. In the example shown the bars have a pitch angle of around 45° so that each makes approximately ⅜th of a complete twist over the 2 meter length of zone 26. The twist of bars 40 is handed so that they operate to urge material in body 10 forward as rotor 36 is driven anticlockwise as viewed in FIG. 2.

The portions 40a of bars 40 in front end zone 24 are non-helical extending normally to the plane of arms 42 so that they sweep around base portion 18 without imparting any longitudinal movement to material therein.

Rotor 36 further includes a return auger 50 in the form of a helically twisted blade of metal plate mounted directly on shaft 38 and extending from the front end wall throughout zone 24 and a short distance into the forward part of zone 26.

Auger 50 has a radius, in this example, of about 40 cm, i.e., its maximum radius is substantially less than and spaced radially within bars 40. It is also of much finer pitch than the helical parts of said bars making approximately one complete twist within its axial length of about 1.2 meter and it is of opposite hand to bars 40 so that it acts to urge material in the part of zone 24 adjacent shaft 38 rearwardly back into zone 26.

Rotor 36 and feed-out rotor 34 are driven in the same direction from PTO input 16 by a transmission 52 at the front of the trailer, conveniently comprising sprocket wheels and drive chain in conventional manner. The mechanism is simple in that both rotors are continuously driven in the same direction during operation of the mixer, no reversing or change gears or clutches being necessary.

In the example described agitation rotor 36 operates at about 8 rpm and feed-out rotor 34 at about 60 rpm.

In use, body 10 will be filled through its open top using a front end loader or the like with the required quantities of feedstuffs or other material. This will normally be done with the rotors running but with door 28 closed so that rotor 34 is idling but the mixing process continues as filling takes place.

Bars 40 provide agitation to effect mixing both by a tumbling action as the material is raised along one side to fall back into the main body, and also by shifting of the material longitudinally towards the front end. As there is no escape at that end while opening 22 is shut, accumulation there is prevented by the opposite action of auger 50 driving the material back to be acted on again by the helical parts of bars 40, so contributing further to the agitation and mixing process.

When the required amounts of material have been loaded the vehicle is driven to the delivery location, mixing and agitation can continue while the vehicle is in motion.

Discharge is effected by simply opening door 28 while drive to the rotors continues, the output being regulated by adjusting door 22, possibly in combination with some adjustment of PTO speed from the tractor control.

When the door is opened the parts 40a of bars 40 sweep the material in the bottom of zone 24 upwardly until it spills through opening 22 to be acted on by rotor 34. At the same time material continues to be fed forward into that zone by the helical parts of bars 40. As the level of material drops it is no longer reached by auger 50 and return to zone 26 practically ceases, bars 40 continuing to sweep the wall of lower part 18 until all the material has been discharged.

Delivery may be made at desired locations with the trailer static, e.g., to fill up feed bins or hoppers, or it may be made with the trailer on the move, e.g., to deliver feedstuffs into troughs along livestock pens or stockyards, the delivery height being sufficient to project the material above fences or the like.

It will be appreciated that variations may be made in the construction and operation above described within the scope of the invention. For some applications a single sweep bar 40 may suffice, possibly on a different helical pitch and/or driven at a different speed to the above. Again, in some applications, the non-helical parts 48 of bars 40 might be dispensed with, the bars stopping short at or near the boundary between zones 24 and 26.

In some cases feed-out rotor 34 could be omitted, delivery being by gravity down a chute or the like directly from opening 22.

Discharge from a central zone of the body may be desirable for some applications, e.g., in the handling of sticky, wet or heavy materials which might tend to consolidate. In this case an intermediate discharge zone will be provided with the side discharge opening and be flanked by front and rear non-discharge zones. This necessitates an agitation rotor of rather more complex construction, though it is to be noted, still a single unit and still driven in the same direction of rotation throughout operation both during mixing and discharge.

There will be helically conformed sweep bars or sweep bar portions in each non-discharge zone oppositely handed to each other so that as the agitation rotor rotates material is transferred forwardly and rearwardly into the discharge zone. The return auger formation of said rotor will also have oppositely handed sections acting to divide material in the discharge zone and return it in opposite directions to both the front and rear non-discharge zones. Operation will otherwise be as described above.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

I claim:

1. A mixer vehicle comprising a body (10) for containing bulk material and having a base portion (18) having a generally semi-cylindrical wall surface centered on a longitudinal axis (20) within the body; a side discharge opening (22) in a discharge zone (24) of the body and controlled by selectively operable closure means (28); and a mixing mechanism comprising a single agitation rotor (36) within the body operatively power driven for rotation about said axis; said agitation rotor comprising at least one sweep bar (40) extending at least the length of at least one non-discharge zone (26) of the body and lying at a periphery of a cylindrical envelope of revolution bounded by or in close proximity to the base portion semi-cylindrical wall surface in at least said at least one non-discharge zone, said at least one bar having a helical conformation of coarse pitch so as to act as a skeleton auger, sweeping material around the semi-cylindrical wall surface with a component of movement along the respective at least one zone toward the discharge zone; characterized in that said mechanism further includes a return auger formation (50) co-extensive with the discharge zone of the body having at least one helical flight and an envelope of revolution of substantially less maximum radius than that of the at least one sweep bar, said at least one flight being so handed as to urge material longitudinally from the discharge zone into the at least one non-discharge zone.

2. A vehicle as in claim 1 characterized by further including a feed-out rotor (34) in an enclosure (32) immediately beyond the discharge opening (22) acting on material passing therethrough in use to project it clear of the body (10).

3. A vehicle as in claim 2 characterized in that the feed-out rotor (34) acts on the material in undershoot fashion.

4. A vehicle as in claim 1, characterized in that the discharge zone is an end zone (24) of the body (10).

5. A vehicle as in claim 1 characterized in that the discharge opening (22) occupies approximately one-third of the total body length.

6. A vehicle as in claim 1 characterized in that the agitation rotor (36) has at least three sweep bars (40) spaced equi-angularly about said axis (20).

7. A vehicle as in claim 6 characterized in that the or each sweep bar extends the full length of the body (10) and has a non-helical portion (40a) co-extensive with the discharge zone (24) acting to sweep material towards the opening (22).

8. A vehicle as in claim 1 characterized in that the closure means is a sliding door (28) for closing the discharge opening (22) or selectively regulating its effective opening.

9. A vehicle as in claim 1 characterized in that the sweep bars (40) include scraper strips (48) pressing against the semicylindrical wall surface (18).

10. A vehicle as in claim 1 characterized in that the radius of the return auger formation (50) is some two-fifths of the radius of the semi-cylindrical wall surface (18).

11. A vehicle as in claim 1 characterized in that the agitation rotor (36) is operatively driven at a speed of about 8 r.p.m.

* * * * *